United States Patent
Karpenko et al.

(10) Patent No.: US 9,841,072 B2
(45) Date of Patent: Dec. 12, 2017

(54) DAMPED BRAKE COMPONENTS AND METHODS OF MANUFACTURING THE SAME

(71) Applicant: FORD GLOBAL TECHNOLOGIES, LLC, Dearborn, MI (US)

(72) Inventors: Yuri Anatoly Karpenko, Brighton, MI (US); J. Chris Oakwood, West Bloomfield, MI (US); Peter Kowalow, Windsor (CA); Charles K. Evans, Willis, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 45 days.

(21) Appl. No.: 14/505,296

(22) Filed: Oct. 2, 2014

(65) Prior Publication Data
US 2016/0097433 A1    Apr. 7, 2016

(51) Int. Cl.
| F16D 65/00 | (2006.01) |
| F16D 65/092 | (2006.01) |
| B62D 19/00 | (2006.01) |
| F16D 65/12 | (2006.01) |
| B22D 19/00 | (2006.01) |
| B22D 19/04 | (2006.01) |

(52) U.S. Cl.
CPC ......... *F16D 65/0006* (2013.01); *B22D 19/00* (2013.01); *B22D 19/04* (2013.01); *F16D 65/0068* (2013.01); *F16D 65/092* (2013.01); *F16D 65/12* (2013.01)

(58) Field of Classification Search
CPC ... F16D 65/092; F16D 65/0068; B62D 19/00; B22D 19/00; B22D 19/04; B22D 19/0081; Y10T 428/24628
USPC ... 188/73.31, 218 XL, 250 B, 250 R, 218 R, 188/251 A
See application file for complete search history.

(56) References Cited

U.S. PATENT DOCUMENTS

| 3,286,799 | A | * | 11/1966 | Shilton | ............... | F16D 65/0006 188/218 A |
| 3,720,293 | A | | 3/1973 | Hikida et al. | | |
| 5,004,078 | A | * | 4/1991 | Oono | .................. | F16D 65/0006 188/218 A |
| 5,143,184 | A | * | 9/1992 | Snyder | .................... | F16D 13/64 188/218 A |
| 5,184,663 | A | * | 2/1993 | Oono | ..................... | B22D 19/00 164/112 |
| 5,358,080 | A | * | 10/1994 | Donabedian | .......... | F16D 65/125 188/18 A |

(Continued)

FOREIGN PATENT DOCUMENTS

| FR | 2 698 425 A1 | 5/1994 |
| GB | 934096 | 8/1963 |

*Primary Examiner* — Robert A Siconolfi
*Assistant Examiner* — San Aung
(74) *Attorney, Agent, or Firm* — Jones Robb, PLLC; Raymond L. Coppiellie

(57) ABSTRACT

A brake component for a motor vehicle may include a body and at least one cable positioned within the body. The at least one cable may include a plurality of wires positioned relative to one another, each of the plurality of wires having a surface in sliding contact with surfaces of adjacent wires of the plurality of wires. During braking of the motor vehicle, sliding movement of the surfaces of the plurality of wires relative to each other may dampen a resonant frequency of the component.

21 Claims, 18 Drawing Sheets

(56) References Cited

U.S. PATENT DOCUMENTS

| | | | |
|---|---|---|---|
| 5,407,034 A | 4/1995 | Vydra et al. | |
| 5,515,950 A | 5/1996 | Kwolek | |
| 5,518,088 A | 5/1996 | Brosilow | |
| 5,855,257 A | 1/1999 | Wickert et al. | |
| 7,975,750 B2 | 7/2011 | Dessouki et al. | |
| 8,104,162 B2 | 1/2012 | Golden et al. | |
| 8,118,079 B2 | 2/2012 | Hanna et al. | |
| 8,245,758 B2 | 8/2012 | Hanna et al. | |
| 8,511,440 B2 | 8/2013 | Kappagantu | |
| 2005/0039992 A1 | 2/2005 | Hurwic | |
| 2007/0235270 A1* | 10/2007 | Miskinis | F16D 65/0006 188/218 XL |
| 2013/0256143 A1 | 10/2013 | Schroth et al. | |

\* cited by examiner

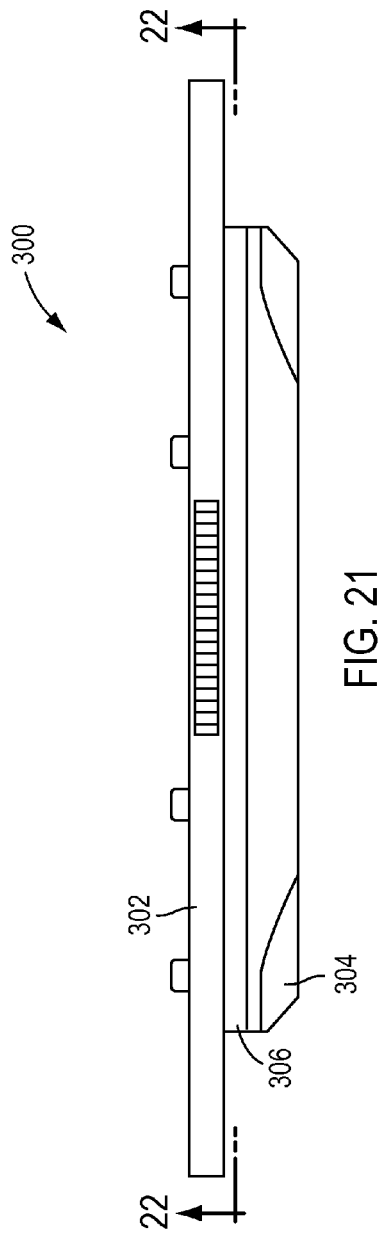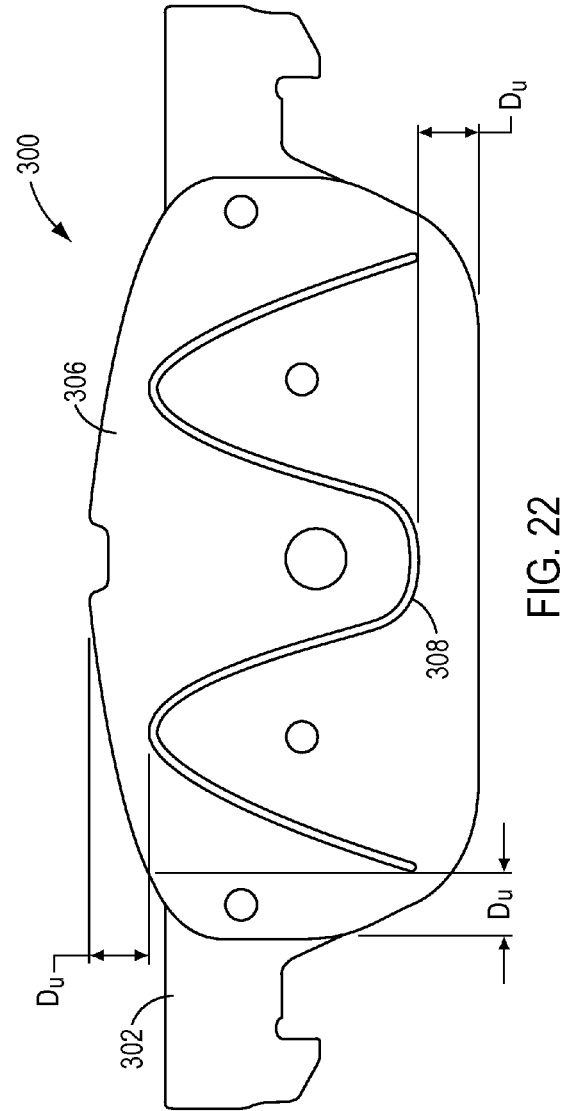

DAMPED BRAKE COMPONENTS AND METHODS OF MANUFACTURING THE SAME

TECHNICAL FIELD

The present disclosure relates generally to vehicle brake components with increased damping capacity. More specifically, the present disclosure relates to brake components with cables positioned within the components and methods of manufacturing such components.

BACKGROUND

Motor vehicle disc brake systems generally utilize a disc brake rotor at each respective wheel. Each rotor, for example, generally includes two oppositely-facing annular friction surfaces which, during operation of the brakes, are engaged by two blocks of friction material (e.g., brake pads) that are moved towards one another into contact with the two friction surfaces so that frictional forces occur and slow the rotation of the rotor, and hence the wheel of the vehicle.

Under light braking pressures (i.e., used to control the speed of the vehicle), brake pads may, however, only make partial contact with the rotor surfaces, leading to unstable frictional forces between the rotor and the brake pads. This unstable behavior of the rotor/pad friction pair may produce high dynamic contact forces, which can, for example, excite strong vibration of the brake pads. Since conventional brake rotors (which are generally formed of a gray cast iron) have multiple resonant frequencies in the audible frequency range, the vibration of the brake pads may in turn excite a resonant vibration in the brake rotor that produces an objectionable squeal noise during operation of the brakes.

In order to prevent squeal noise occurrence, brake components, such as, for example, brake pads and rotors, may be configured with dampers to reduce brake pad vibration and suppress rotor resonant vibration. Conventional damped pads and rotors may include, for example, dampers which utilize friction damping (i.e., Coulomb damping) from contact pressure between two surfaces that have a relative whole-body motion between each other (i.e., full slip can develop between the surfaces). Such dampers may include, for example, solid inserts and damper rings, which create contact pressure between a surface of the insert/ring and a surface of the pad/rotor or a filler material within the pad/rotor.

Although such damped rotor/pad designs provide some vibration suppression, the damper effectiveness of such designs varies with brake temperature. The full slip condition between the sliding surfaces of such components changes, for example, with brake temperature, which may result in a change in contact pressure between the surfaces and a resulting change in damper effectiveness (i.e., a decrease in damper effectiveness). Since the operating temperature range for a conventional brake component is very wide (e.g., from about −40° C. after an overnight in a cold climate during the winter to about 500° C. during an emergency stop from high speed or during a continuous use of the brakes while driving in a mountainous area), the friction damper effectiveness of such designs is also widely variable, and may not prevent squeal noise during certain temperature conditions.

It may, therefore, be advantageous to provide a brake component (e.g., a brake rotor and/or brake pad) with an improved damping capacity that continuously prevents brake squeal noise. It may also be advantageous to provide a brake component having an invariable damper effectiveness that is unaffected by brake temperature changes.

SUMMARY

In accordance with various exemplary embodiments, a brake component for a motor vehicle may include a body and at least one cable positioned within the body. The at least one cable may include a plurality of wires positioned relative to one another, each of the plurality of wires having a surface in sliding contact with surfaces of adjacent wires of the plurality of wires. During braking of the motor vehicle, sliding movement of the surfaces of the plurality of wires relative to each other may dampen a resonant frequency of the component.

In accordance with various additional exemplary embodiments, a brake rotor for attachment to a wheel of a motor vehicle may include a cheek portion and at least one cable positioned within the cheek portion. The at least one cable may include a plurality of wires positioned relative to one another, each of the plurality of wires having a surface in sliding contact with surfaces of adjacent wires of the plurality of wires. During braking of the motor vehicle, sliding movement of the surfaces of the plurality of wires relative to each other may dampen a resonant frequency of the rotor.

In accordance with various additional exemplary embodiments, a brake pad assembly for a motor vehicle may include a rigid backing structure and a friction material carried by the rigid backing structure. The assembly may also include at least one cable. The at least one cable may include a plurality of wires positioned relative to one another, each of the plurality of wires having a surface in sliding contact with surfaces of adjacent wires of the plurality of wires. During braking of the motor vehicle, sliding movement of the surfaces of the plurality of wires relative to each other may dampen a resonant frequency of the brake pad.

In accordance with various further exemplary embodiments, a method of manufacturing a brake component for a motor vehicle may include positioning at least one cable within the brake component. The at least one cable may include a plurality of wires in sliding contact with one another. The at least one cable may be positioned within the brake component so that, during braking of the motor vehicle, the at least one cable is configured to dampen a resonant frequency of the component via friction generated by sliding movement between the plurality of wires.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 21 is a side view of the brake pad of FIG. 20;

FIG. 22 is a cross-sectional view of the brake pad of FIG. 20 taken through line 22-22 of FIG. 21, which shows a cable embedded within an underlayer material of the brake pad;

Figure 1:
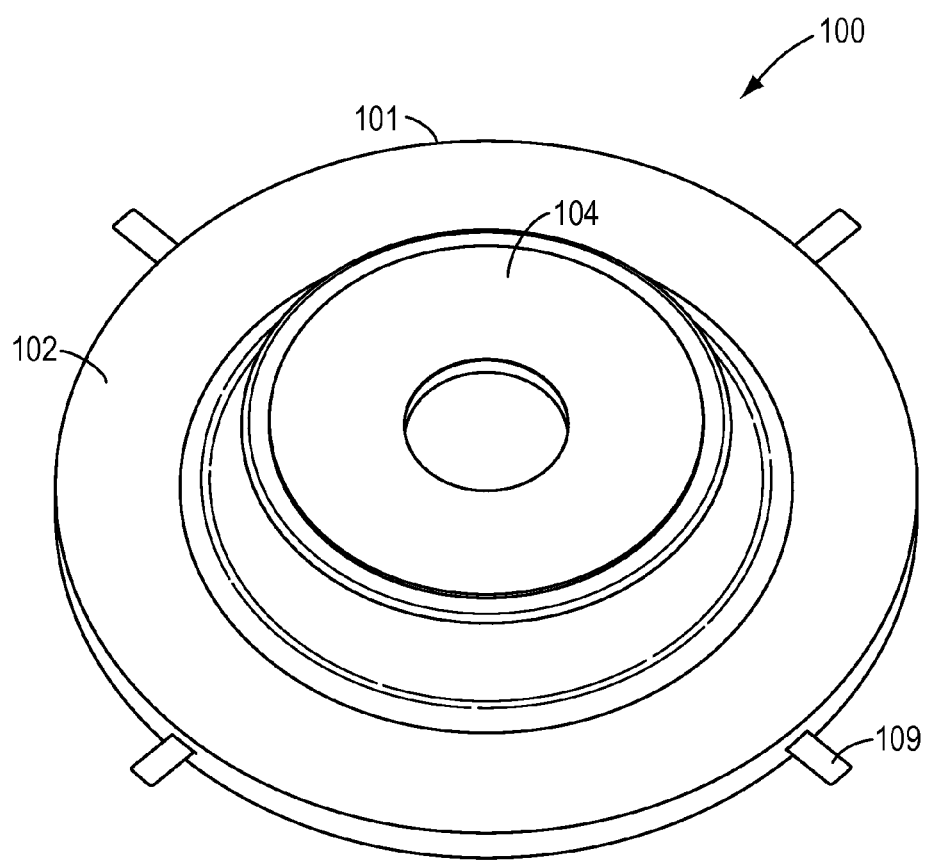
FIG. 1 is a perspective view of an exemplary embodiment of a damped brake rotor in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates brake components which utilize cables positioned (e.g., embedded) within the components to improve the damping capacity of the components. For instance, the exemplary embodiments described herein utilize friction created by relative movement (e.g., sliding) between individual wires of the embedded cable (i.e., Coulomb friction) to dampen a resonant frequency of the component. Various exemplary embodiments described herein, for example, contemplate a brake component that includes at least one cable positioned within a body of the component. The at least one cable includes a plurality of wires positioned relative to one another, each of the plurality of wires having a surface in sliding contact with surfaces of adjacent wires of the plurality of wires, such that sliding movement of the surfaces relative to each other may dampen a resonant frequency of the component. In other words, during braking of the motor vehicle, the at least one cable may dampen the resonant frequency of the component via Coulomb friction generated by the sliding movement between the surfaces of the individual wires of the cable.

Furthermore, due to its flexible structure, the at least one cable may undergo relatively large elastic distortions without any noticeable change in contact pressure between the individual wires of the cable. Thus, brake components in accordance with the present disclosure (which rely on a "static" interwire friction force to dampen undesired brake squeal noise) are also relatively impervious to brake temperature changes.

As understood by those of ordinary skill in the art, Coulomb friction is a simplified quantification of the friction force that exists between two dry surfaces in contact with each other. Accordingly, as would also be understood by those of ordinary skill in the art, Coulomb friction damping, as utilized herein, is the effect of the friction force to dissipate energy from a vibrating component and/or system. In other words, Coulomb friction damping refers to a type of constant mechanical damping in which energy is absorbed via sliding friction. For example, in accordance with the present disclosure, kinetic energy from a vibrating brake component is converted into thermal energy or heat by the sliding friction.

FIGS. 1-7 illustrate an exemplary embodiment of a damped brake rotor 100 in accordance with the present disclosure. The brake rotor 100 includes a body 101 and at least one cable 108 (e.g. two cables 108 being shown in the exemplary brake rotor 100) positioned within the body 101. The body 101 includes a solid cheek portion 102 and a mounting surface 104. In various exemplary embodiments, the mounting surface 104 extends from the cheek portion 102 to connect the brake rotor 100 to a wheel (not shown) of a motor vehicle (not shown) via, for example, a steering knuckle 700 (see FIG. 31).

Figure 2:
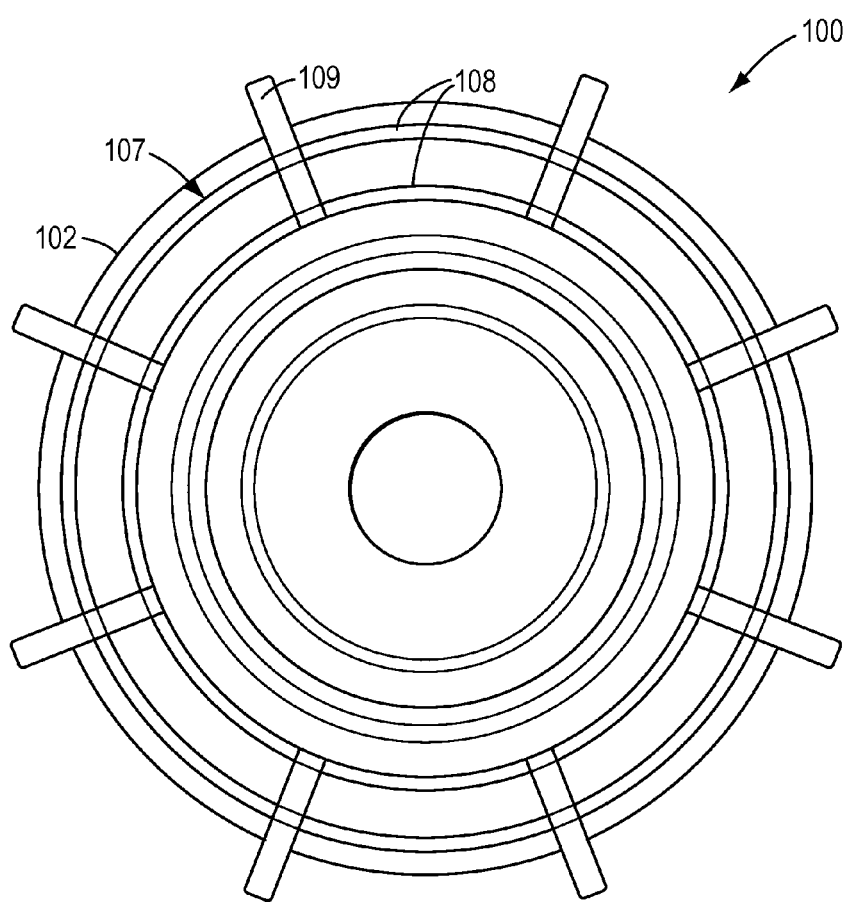
FIG. 2 is a top view of the brake rotor of FIG. 1, with a portion removed to show a cable insert.
Figure 3:
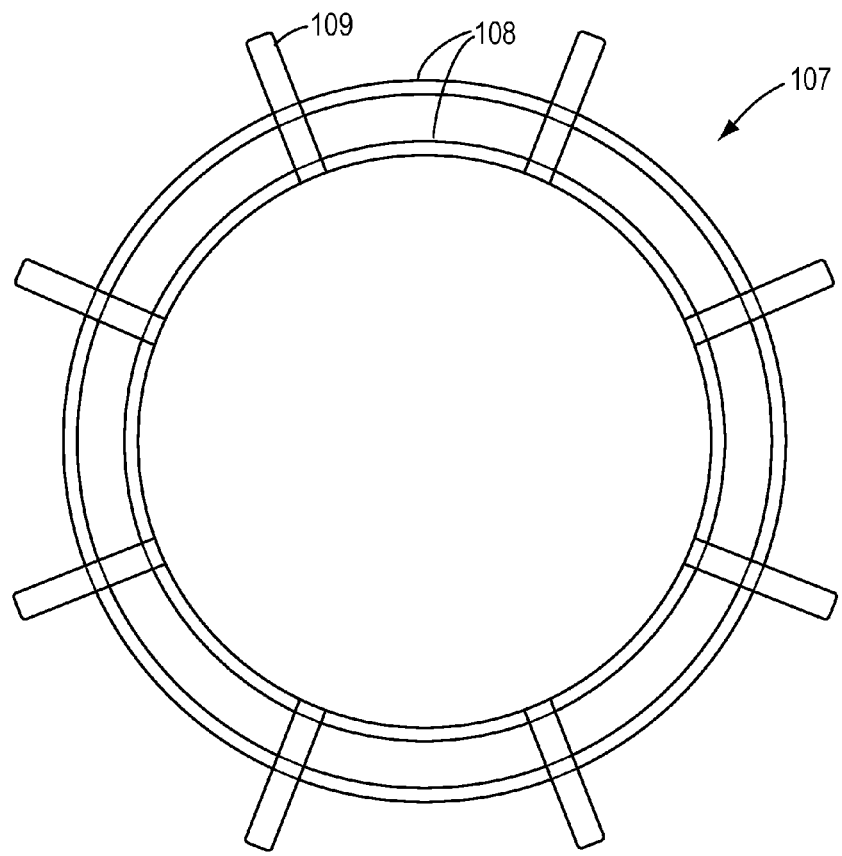
FIG. 3 is a top view of the cable insert of the brake rotor of FIG. 1.
Figure 4:
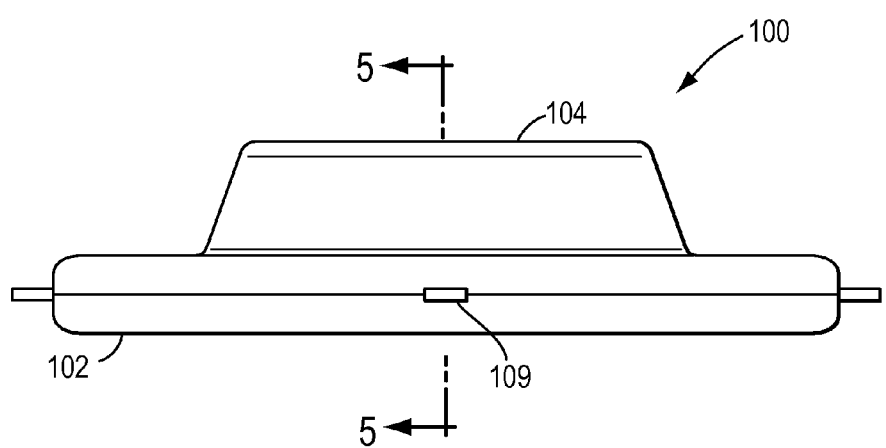
FIG. 4 is a side view of the brake rotor of FIG. 1.
Figure 5:
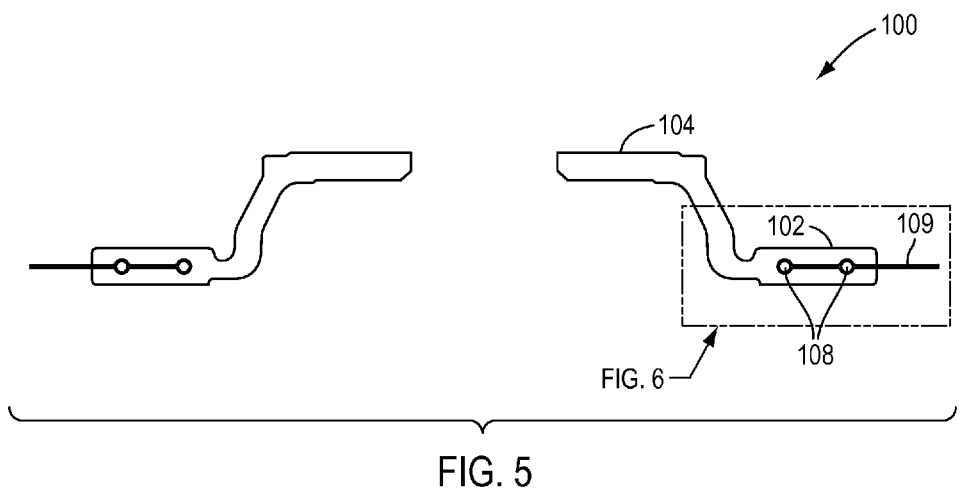
FIG. 5 is a cross-sectional view of the brake rotor of FIG. 1 taken through line 5-5 of FIG. 4.
Figure 6:
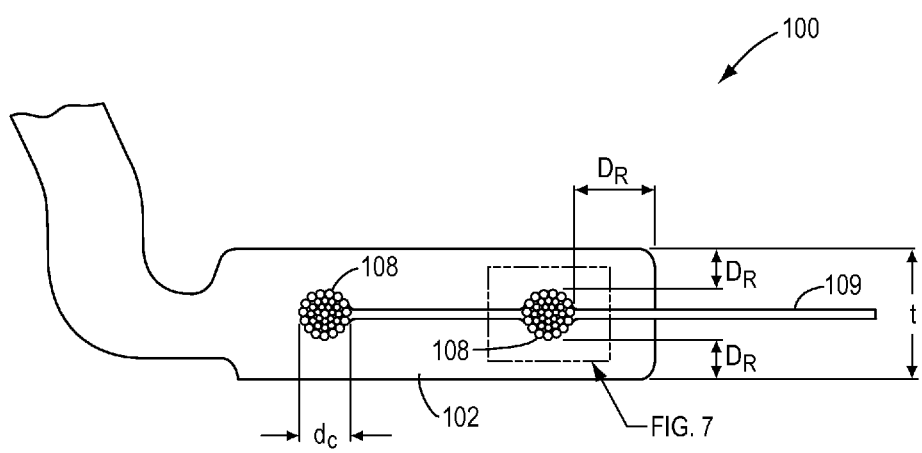
FIG. 6 is an enlarged, partial cross-sectional view of the brake rotor of FIG. 1.

In various exemplary embodiments, the cables 108 are embedded within the solid cheek portion 102. As explained in more detail below, various embodiments of the present disclosure, contemplate embedding the cables 108 within the cheek portion 102 during the rotor casting process such that the cables 108 are centrally positioned within the cheek portion 102. In various exemplary embodiments, and perhaps as best shown in FIGS. 2 and 3, the cables 108 are configured as an insert 107 that is embedded within the cheek portion 102. The insert 107 may, for example, include at least one locator feature 109 (e.g., seven locator features 109 being shown in the exemplary brake rotor 100), which is configured to both hold the cables 108 together and maintain the shape of each cable 108 (and the overall shape of the insert 107). As also explained below, in various additional embodiments, the at least one locator feature 109 also is used during the rotor casting process to locate the insert 107 within a casting mold 120 (see FIG. 8)). In this manner, the cables 108 may be properly positioned and aligned within the cheek portion 102 (of the cast rotor 100) to maximize their damping capacity.

As above, the insert 107 may, for example, be relatively centrally positioned within the cheek portion 102 to prevent exposure of the cables 108 if the rotor 100 begins to degrade (i.e., if the cheek portion 102 starts wearing down). In various embodiments, for example, in which the cheek portion 102 has a thickness t of about 12 mm, each cable 108 may be positioned such that an outer surface of the cable 108 is at least about 3 mm from an outer surface of the rotor 100. In other words, each cable 108 may be positioned such that there is a distance $D_R$ of at least about 3 mm between the cable 108 and an outer surface of the cheek portion 102 (see FIG. 6).

Figure 7:
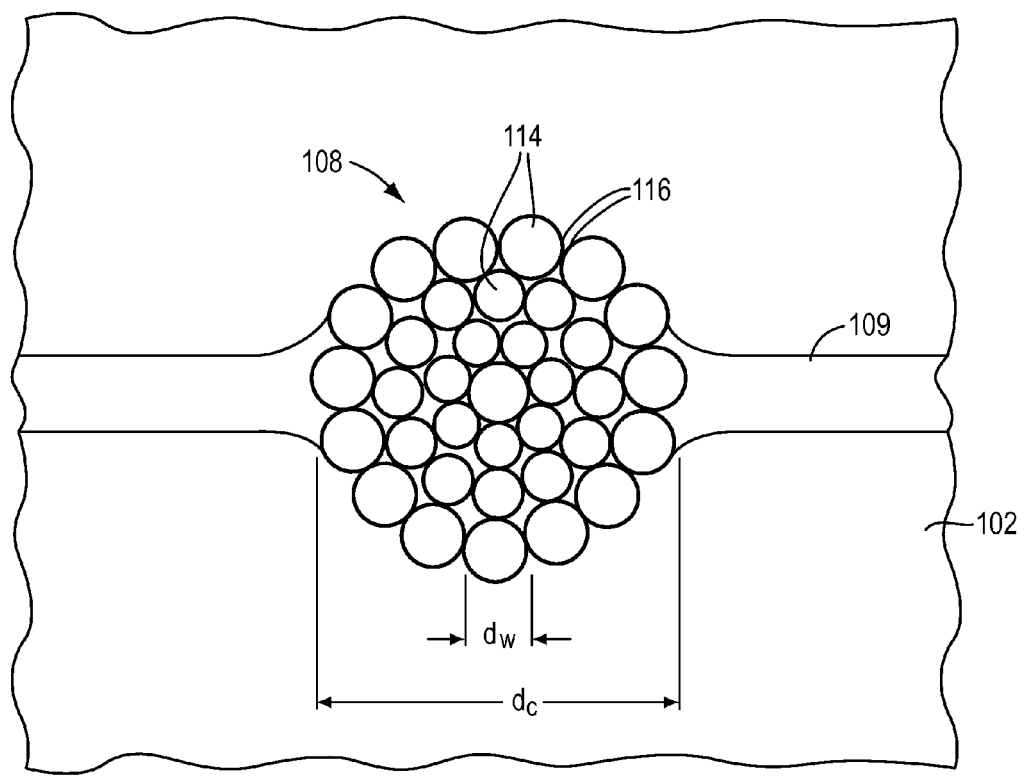
FIG. 7 shows a detailed view of a cable of the cable insert of the brake rotor of FIG. 1.

As best shown perhaps in the enlarged view of FIG. 7, each cable 108 includes a plurality of wires 114. In various embodiments, for example, each cable 108 has a diameter $d_c$ of about 3 mm to about 6 mm, and includes about 7 to about 60 wires 114. Those of ordinary skill in the art would understand, however, that the cable 108 illustrated in FIG. 7 is exemplary only and intended to illustrate one embodiment of the present disclosure. The present disclosure, therefore, contemplates cables 108 having any number, type, and/or configuration (i.e., dimension and/or geometry) of wires 114, based on a particular application. In accordance with various embodiments, for example, the wires 114 may form a helical, parallel-wire, or locked-coil strand cable 108, as understood by those of ordinary skill. Those of ordinary skill in the art would further understand that the wires 114 (i.e., forming each cable 108) may each have the same diameter (e.g., $d_w$ as illustrated FIG. 7), or may have differing diameters.

In accordance with various exemplary embodiments, the wires 114 at the outer diameter of each cable 108 can be rigidly bonded to the casting iron of the rotor 100 during the rotor casting process. In various embodiments, for example, to prevent the wires 114 (i.e., at the outer diameter of the cable 108) from separating from the rotor 100, a cable 108 with a similar coefficient of thermal expansion to the iron of the rotor 100 and a higher melting point than the iron of the rotor 100 may be chosen. In this manner, the insert 107 is held firmly in place within the rotor cheek 102, and prevents relative whole-body motion between internal surfaces of the rotor cheek 102 and outer surfaces of the cables 108 (i.e., preventing full slip from developing between the surfaces of the rotor 100 and the cables 108). This bonding may additionally help to maintain the structural integrity of the rotor 100, which could otherwise be comprised due to the embedded cable 108.

As also shown in FIG. 7, the wires 114 of each cable 108 are in contact with one another such that a state of Coulomb friction exists between the wires 114. In other words, respective surfaces 116 of the wires 114 are in contact with each other such that a friction force (Coulomb friction) exists between each respective pair of contacting surfaces 116 of the wires 114. During braking of the motor vehicle, the cables 108 may, therefore, dampen a resonant frequency of the rotor 100 via the Coulomb friction between the wires 114, which works to absorb the kinetic energy of the rotor 100 (i.e., produced from the vibration of the rotor 100) and convert it into thermal energy. As would be understood by those of ordinary skill in the art, the damping capacity of each cable 108 is a function of the total surface contact area of the individual wires 114 forming the cable 108. Accordingly, the larger the surface contact area between the wires 114, the higher the damping capacity of the cable 108. In this manner, the size, density, and spacing of the wires 114 may be chosen based on a desired damping capacity of the cables 108.

In accordance with various exemplary embodiments, the at least one cable 108 may be shaped and/or configured to provide a specific pattern, or spatial distribution of damping capacity, across the cheek portion 102 to increase damping capacity most in the areas of the cheek 102 that have the highest vibration amplitudes during rotor resonances. As illustrated in FIGS. 1-7, in various embodiments, for example, the cables 108 may form a series of circular rings, which increase the damping capacity of the solid rotor cheek portion 102. The present disclosure, however, contemplates brake rotors including any number, configuration (i.e., dimension and/or geometry), shape (i.e., pattern), and/or orientation of cables 108, having any number and/or configuration of wires 114, based on a particular application. Those of ordinary skill in the art would understand, therefore, that the brake rotor 100 illustrated in FIGS. 1-7 is exemplary only and intended to illustrate one embodiment of the present disclosure. Accordingly, damped brake rotors in accordance with the present disclosure may have various configurations and/or orientations of cheeks and cables (e.g., inserts) positioned within, without departing from the scope of the present disclosure and claims, and are not bound by any specific geometries and/or orientations.

Figure 13:
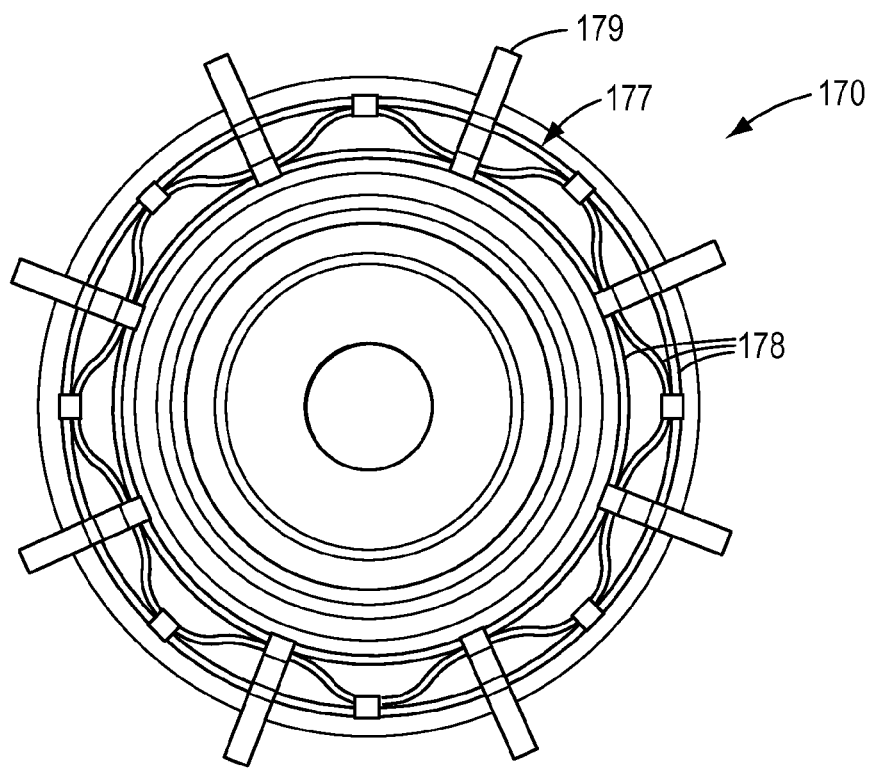
FIG. 13 is a top view of yet another exemplary embodiment of a damped brake rotor in accordance with the present disclosure, with a portion removed to show a cable insert.
Figure 14:
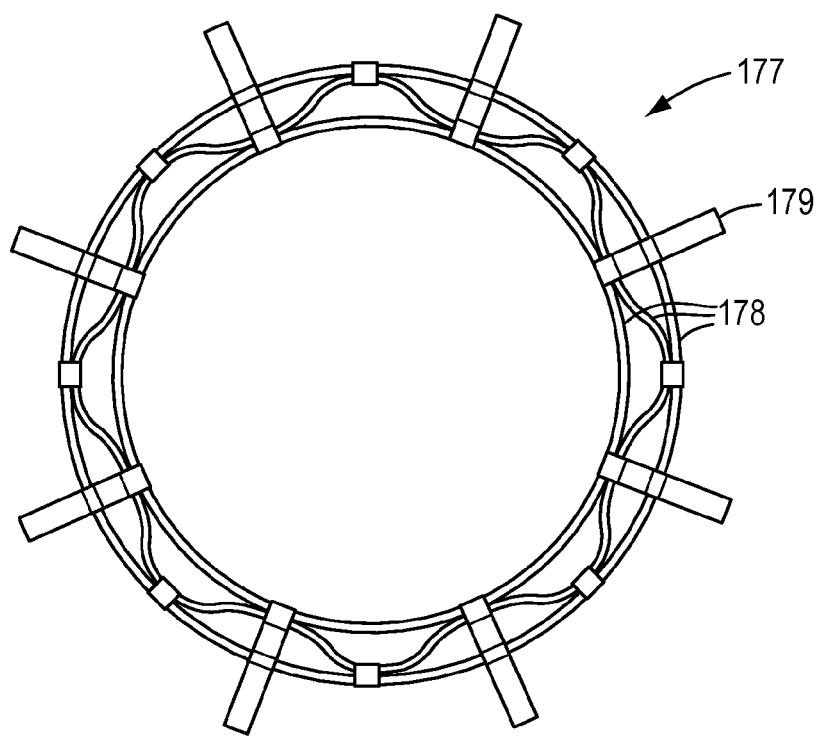
FIG. 14 is a top view of the cable insert of the brake rotor of FIG. 13.

Thus, in accordance with various embodiments of the present disclosure, a damped brake rotor may include inserts having various numbers of cables forming various patterns (i.e., having various spatial distributions). As illustrated in FIGS. 9-12, in various embodiments, for example, a damped brake rotor 150, 160 may respectively include an insert 157, 167 having a cable 158, 168 forming a wave pattern (e.g., a sine wave, wherein a period of a wave formed by the cable 158 is larger than a period of a waved formed by the cable 168). And, in various additional embodiments, a damped brake rotor 170 may include an insert 177 having cables 178 forming a pattern that combines circular rings with a wave pattern (e.g. a sine wave), as illustrated in FIGS. 13 and 14. Similar to the above insert 107 of the rotor 100, each of the inserts 157, 167, 177 may also respectively include at least one locator feature 159, 169, 179 that is used, for example, to locate the insert 159, 169, 179 within a casting mold during the rotor casting process.

In accordance with various additional embodiments of the present disclosure, a damped brake rotor may have a vented cheek portion. FIGS. 15-19 illustrate, for example, an exemplary embodiment of a damped, ventilated brake rotor 200 in accordance with the present disclosure. The brake rotor 200 includes a cheek portion 202 having an outer friction member 203 that is connected to an inner friction member 205 by a plurality of fin elements 206. The brake rotor 200, for example, further includes a mounting surface 204 that extends from the inner friction member 205 to connect the brake rotor 200 to a wheel (not shown) of a motor vehicle (not shown). In this manner, the outer friction member 203 is configured to face away from the vehicle when the rotor 200 is attached to the wheel, and the inner friction member 205 is configured to face towards the vehicle when the rotor 200 is attached to the wheel.

Figure 15:
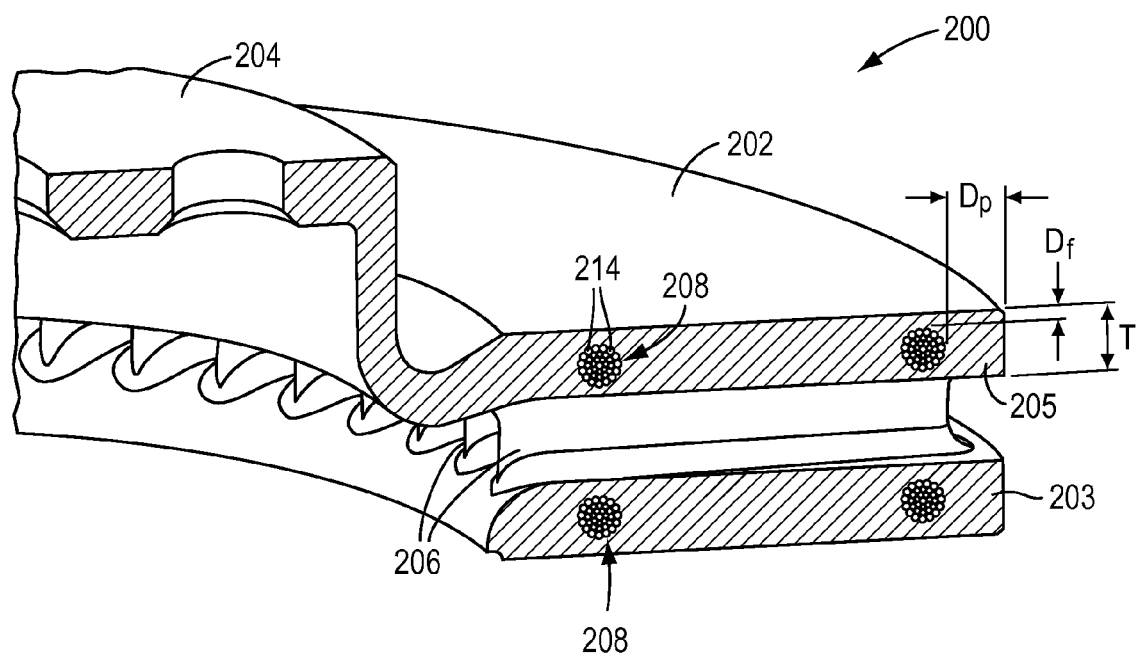
FIG. 15 is an enlarged, partial cross-sectional view of yet another exemplary embodiment of a damped brake rotor in accordance with the present disclosure.
Figure 16:
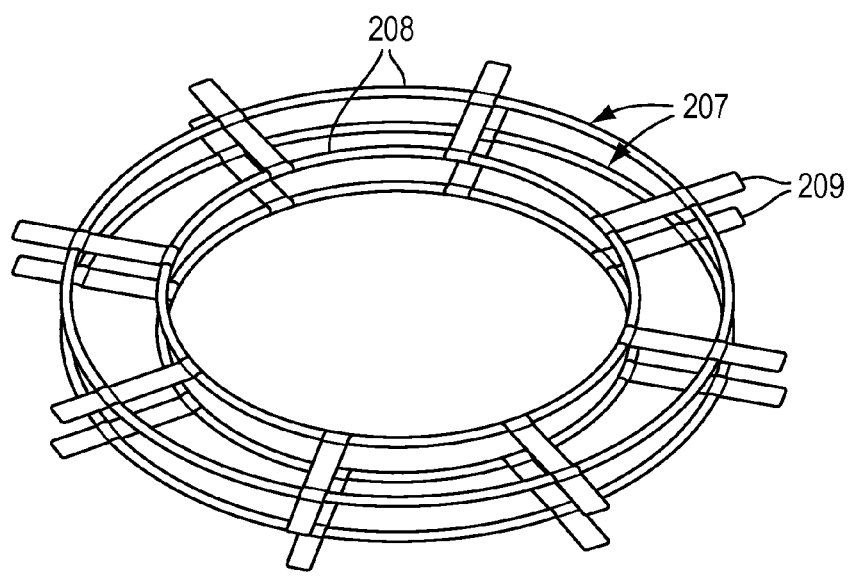
FIG. 16 is a perspective view of a cable insert of the brake rotor of FIG. 15.

Similar to the brake rotor 100, the brake rotor 200 includes at least one cable 208 (e.g., four cables 208 being shown in the exemplary brake rotor 200) embedded within the cheek portion 202, wherein each cable 208 includes a plurality of wires 214 in contact with one another such that a state of Coulomb friction exists between the wires 214. As above, various embodiments of the present disclosure, contemplate embedding cables 208 within the cheek portion 202 during the rotor casting process. In various exemplary embodiments, the cables 208 are embedded within one or both of the outer and inner friction members 203 and 205. As illustrated in FIGS. 15 and 16, for example, in various embodiments, the cables 208 are configured as inserts 207 that are embedded in each of the outer and inner friction members 203 and 205. Each insert 207 may, for example, include at least one locator feature 209 (e.g., seven locator features 209 being shown on each exemplary insert 207), which, as above, is configured to hold the cables 208 together, maintain the shape of each cable 208 (and the overall shape of each insert 207), and to locate each insert 207 within the casting mold. Thus, as above, the cables 208 may be properly positioned and aligned within each respective friction member 203, 205 (of the cast rotor 200) to maximize their damping capacity.

Similar to the insert 107, each insert 207 may, for example, be relatively centrally positioned within each respective friction member 203, 205 to prevent exposure of the cables 208 if the rotor 200 begins to degrade (i.e., if the cheek portion 202 starts wearing down). In various embodiments, for example, in which each friction member 203, 205 has a thickness T of about 7 mm to about 13 mm, each cable 208 may be positioned such that an outer surface of the cable 208 is at least about 3 mm from an outer face of the rotor 200 and at least about 5 mm from a peripheral edge of the rotor 200. In other words, each cable 208 may be positioned such that there is a distance $D_f$ of at least about 3 mm between the cable 208 and an outer face of the cheek portion 202 and a distance $D_p$ of at least about 5 mm between the cable 208 and a peripheral edge of the cheek portion 202. (see FIG. 15).

As above, the cables 208 may be shaped and/or configured to provide a specific pattern, or spatial distribution of damping capacity, across the cheek portion 202 to increase damping capacity most in the areas of the cheek 202 that have the highest vibration amplitudes during rotor resonances. As illustrated in FIGS. 15 and 16, in various embodiments, for example, the cables 208 may form a series of circular rings, which increase the damping capacity of each of the outer and inner friction members 203 and 205. Also as above, however, the preset disclosure contemplates ventilated brake rotors including any number, configuration (i.e., dimension and/or geometry), shape (i.e., pattern), and/or orientation of cables 208, having any number and/or configuration of wires 214.

Figure 17:
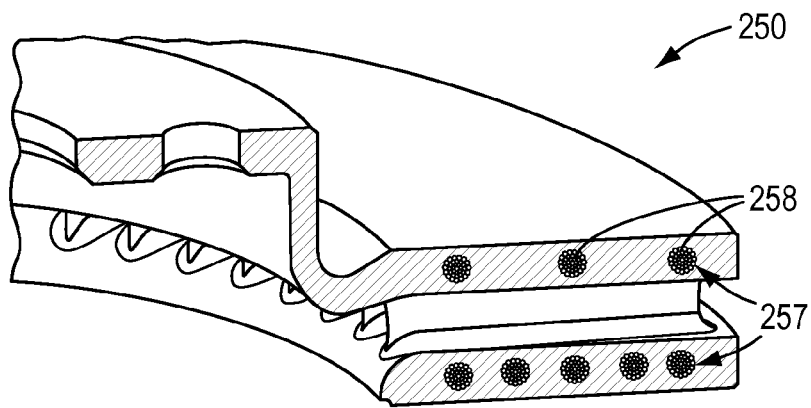
FIG. 17 is an enlarged, partial cross-sectional view of yet another exemplary embodiment of a damped brake rotor in accordance with the present disclosure.
Figure 18:
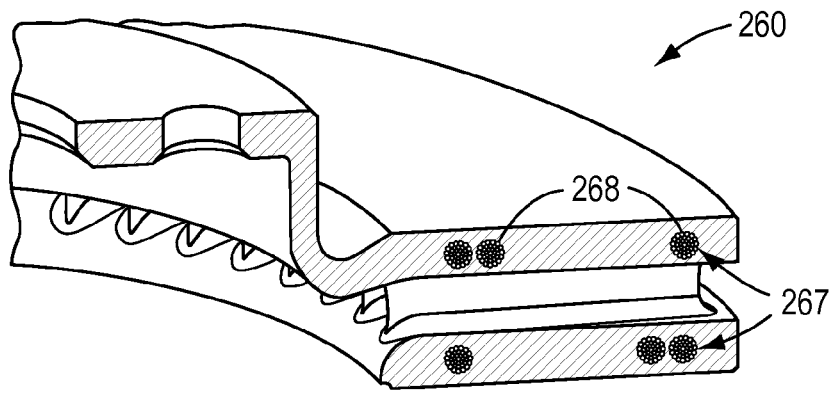
FIG. 18 is an enlarged, partial cross-sectional view of yet another exemplary embodiment of a damped brake rotor in accordance with the present disclosure.
Figure 19:
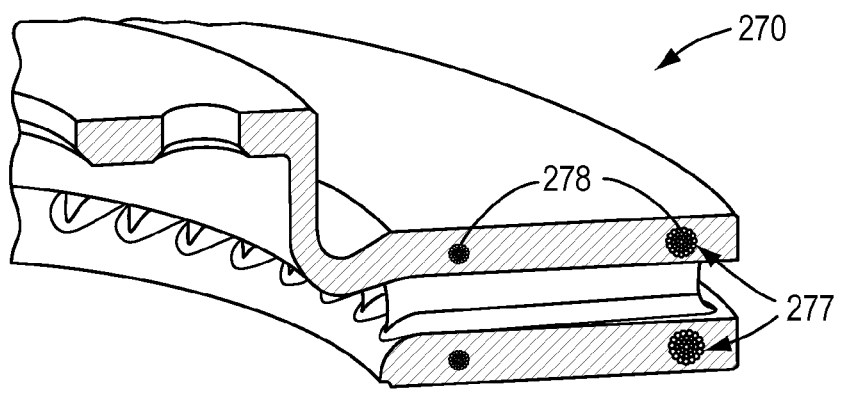
FIG. 19 is an enlarged, partial cross-sectional view of yet another exemplary embodiment of a damped brake rotor in accordance with the present disclosure.

Those of ordinary skill in the art would understand, therefore, that the ventilated brake rotor 200 illustrated in FIGS. 15 and 16 is exemplary only and intended to illustrate one embodiment of the present disclosure. Accordingly, damped, ventilated brake rotors in accordance with the present disclosure may have various configurations and/or orientations of friction members and cables (e.g., inserts) positioned within, without departing from the scope of the present disclosure and claims, and are not bound by any specific geometries and/or orientations. Furthermore, the outer fiction member 203 may have a different insert configuration than the inner friction member 205 (see FIG. 17). As illustrated in FIGS. 17-19, in various embodiments, for example, a damped, ventilated brake rotor 250, 260, 270 may respectively include inserts 257, 267, 277 having cables 258, 268, 278 arranged in various configurations, and having various diameters.

Those of ordinary skill in the art would further understand that the brake rotors 100, 200, 250, 260, 270 illustrated in FIGS. 1-19 are exemplary only and intended to illustrate one type of brake component contemplated by the present disclosure. As discussed below with reference to FIGS. 20-32, the present disclosure contemplates various additional types and configurations of brake components, which utilize cables positioned within the components to improve the damping capacity of the components.

Figure 20:
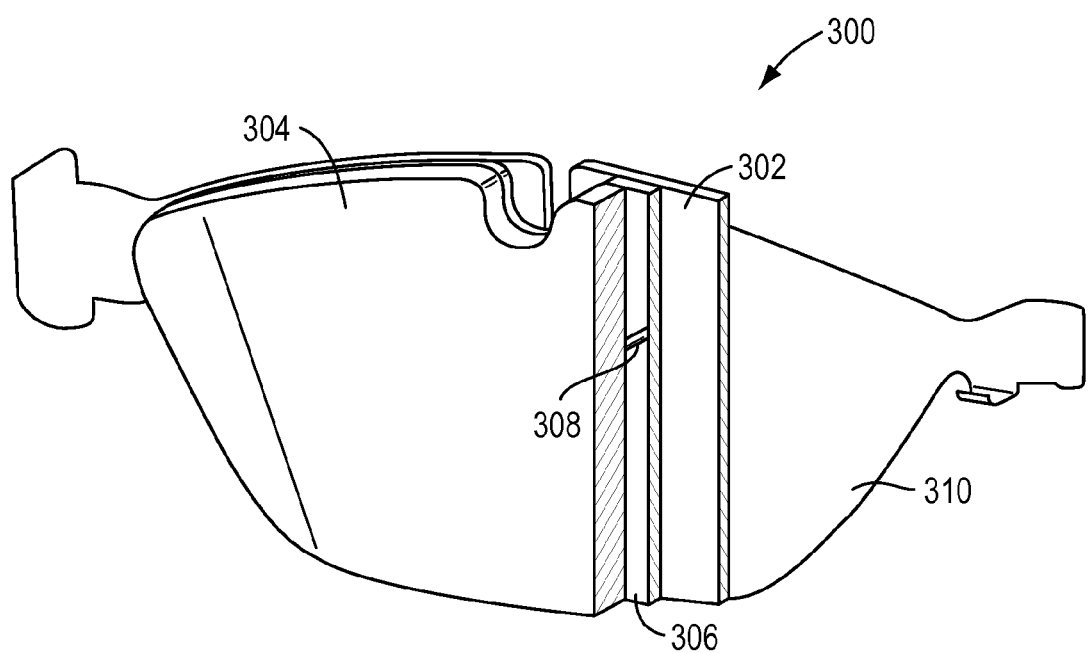
FIG. 20 is a perspective view of an exemplary embodiment of a damped brake pad in accordance with the present disclosure, with portions cut away to show the different layers of the brake pad.

Various additional embodiments of the present disclosure contemplate, for example, brake pads, which utilize Coulomb friction between individual wires of the cable positioned within the pad to dampen a resonant frequency of the pad. FIGS. 20-22 illustrate an exemplary embodiment of a damped brake pad assembly 300 in accordance with the present disclosure. The brake pad 300 includes a rigid backing structure 302, such as, for example, a metallic backing plate, and a friction material 304 that is carried by the rigid backing structure 302. The friction material 304 is made, for example, from a material and/or combination of materials which have a high coefficient of friction and which may also absorb and disperse large amounts heat. In various embodiments, for example, the friction material 304 may include a non-asbestos organic, semi-metallic, and/or ceramic material.

Those of ordinary skill in the art would understand, however, that brake pads in accordance with the present disclosure may include various types and/or configurations of backing structures and friction materials, which are formed from various materials, based on a particular braking application. Furthermore, brake pads in accordance with the present disclosure may include additional components and/or materials, including, for example, a shim 310 attached to an outer surface of the backing structure (see FIG. 20) to help correct small differences (which may sometimes lead to noise) between the backing structure and a caliper to which it is attached.

In various exemplary embodiments, the friction material 304 is bound to a surface of the backing plate 302 to create a friction surface that is configured to face a brake rotor when positioned within the motor vehicle (not shown), and the shim 310 is bound to an opposite surface of the backing plate 302 (which is configured to be attached to a caliper (see FIG. 27) when positioned within the vehicle). In various embodiments, for example, two brake pads 300 may be contained within the brake caliper (i.e., positioned over a cheek portion of the rotor) with their friction surfaces facing the rotor. In this manner, when the brakes are applied, the caliper clamps or squeezes the two pads 300 together onto the spinning rotor to slow and/or stop the vehicle.

Similar to the above damped brake rotors, in accordance with various exemplary embodiments, the brake pad assembly 300 also includes at least one cable 308 (e.g., one cable 308 being shown in the exemplary brake pad 300) positioned within the brake pad 300. In various embodiments, for example, the cable 308 may be positioned within the friction material 304. As shown perhaps best in FIG. 22, in various additional embodiments, the brake pad 300 may include an underlayer material 306 that is positioned between the backing structure 302 and the friction material 304, and the cable 308 may be positioned within the underlayer material 306.

The cable 308 may, for example, be positioned and aligned within the underlayer material 306 to maximize its damping capacity. Similar to the above cable inserts, in various embodiments, the cable 308 may be relatively centrally positioned within the underlayer material 306 to minimize exposure of the cable 308 once the brake pad 300 begins to degrade (e.g., if the friction material 304 wears down to expose the underlayer material 306). In various embodiments, for example, the cable 108 may be positioned such that the cable 108 is at least about 2 mm to about 3 mm from an outer edge of the underlayer material 306 (and from the backing structure 302). In other words, the cable 108 may be positioned such that there is a distance $D_U$ of at least about 2 mm to about 3 mm between any portion of the cable 108 and an outer periphery of the underlayer material 306 (see FIG. 22).

Similar to the cables 108 above, the cable 308 includes a plurality of wires (not shown). In various embodiments, for example, the cable 308 has a diameter of about 1 mm to about 3 mm, and includes about 3 to about 20 wires, each having a diameter of about 0.1 mm to about 1.4 mm. Also as above, the wires of the cable 308 are in contact with one another such that a state of Coulomb friction exists between the wires. Thus, similar to the cables 108, during braking of the motor vehicle, the cable 308 may dampen a resonant frequency of the brake pad 300 via the Coulomb friction between the contacting surfaces of the wires, which works to absorb the kinetic energy of the brake pad 300 and convert it into thermal energy.

In accordance with various exemplary embodiments, the cable 308 is loosely positioned within the underlayer material 306 such that a relative whole-body motion may develop between internal surfaces of the underlayer material 306 and an outer surface of the cable 108 (i.e., allowing full slip to develop between the surfaces of the underlayer material 306 and the cable 108). In this manner, a friction force (Coulomb friction) also exists between the contacting surfaces of the underlayer material 306 and the cable 308, which may also help to dampen the resonant frequency of the brake pad 300 during braking of the motor vehicle.

Similar to the above cables 108, the at least one cable 308 may be shaped and/or configured to provide a specific pattern, or spatial distribution of damping capacity, across the underlayer material 306 to increase damping capacity most in the areas of the underlayer material 306 that have the highest vibration amplitudes during brake pad resonances. As illustrated in FIGS. 20-22, in various embodiments, for example, the cable 308 may form a wave pattern (e.g. a sine wave), which increases the damping capacity of the brake pad 300. The present disclosure, however, contemplates brake pads including any number, configuration (i.e., dimension and/or geometry), shape (i.e., pattern), and/or orientation of cables 308, having any number and/or configuration of wires. Those of ordinary skill in the art would understand, therefore, that the brake rotor 300 illustrated in FIGS. 20-22 is exemplary only and intended to illustrate one embodiment of the present disclosure.

Figure 23:
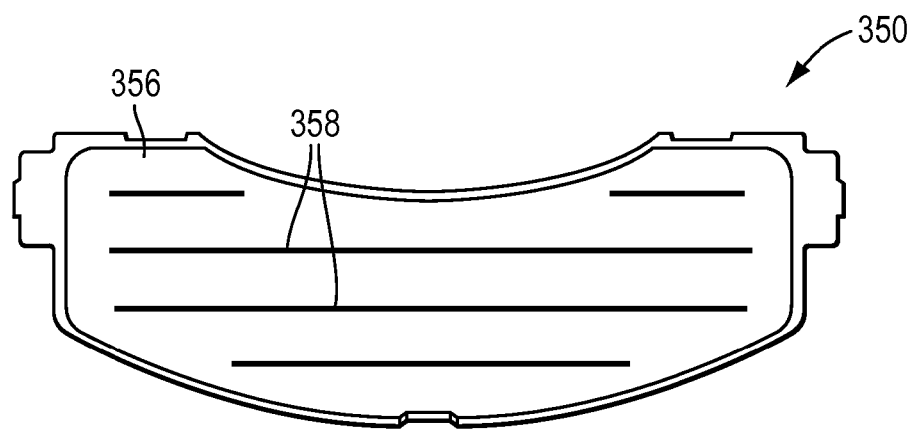
FIG. 23 is a cross-sectional view of another exemplary embodiment of a damped brake pad in accordance with the present disclosure, which shows a cable embedded within an underlayer material of the brake pad.
Figure 24:
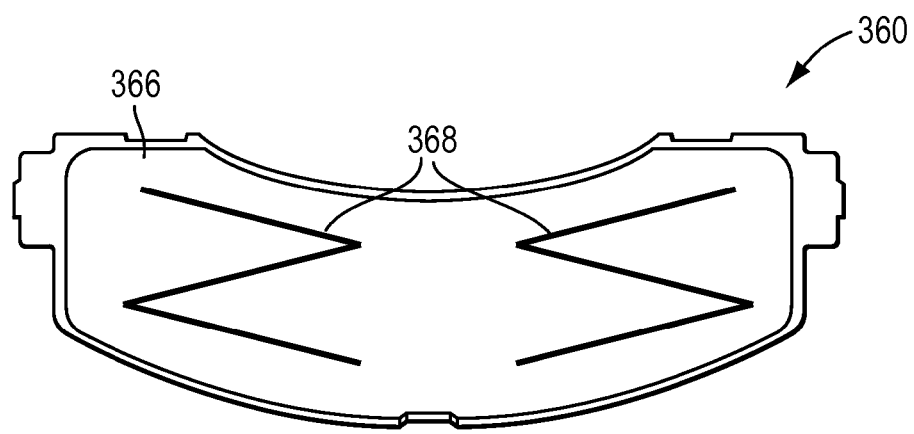
FIG. 24 is a cross-sectional view of yet another exemplary embodiment of a damped brake pad in accordance with the present disclosure, which shows a cable embedded within an underlayer material of the brake pad.
Figure 25:
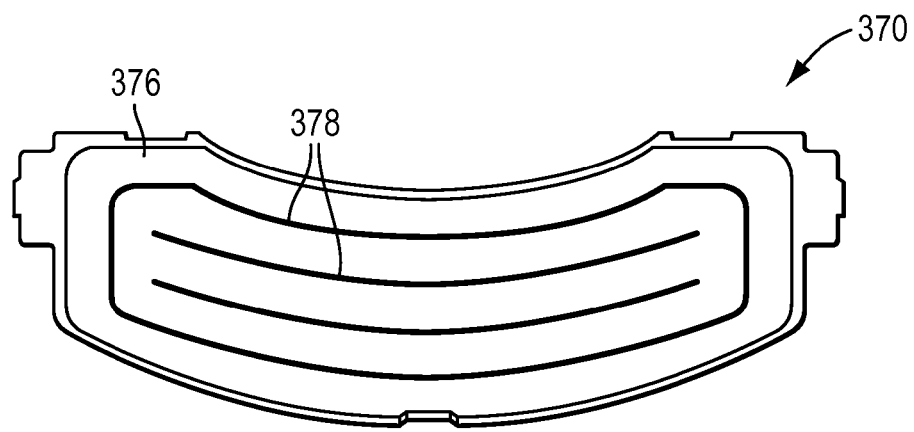
FIG. 25 is a cross-sectional view of yet another exemplary embodiment of a damped brake pad in accordance with the present disclosure, which shows a cable embedded within an underlayer material of the brake pad.

Accordingly, damped brake pads in accordance with the present disclosure may have various configurations and/or orientations of underlayer materials and cables positioned within, without departing from the scope of the present disclosure and claims, and are not bound by any specific geometries and/or orientations. As illustrated in FIGS. 23-25, in various embodiments, for example, a damped brake pad 350, 360, 370 may respectively include a plurality of cables 358, 368, 378 positioned within respective underlayer materials 356, 366, 376.

Figure 26:
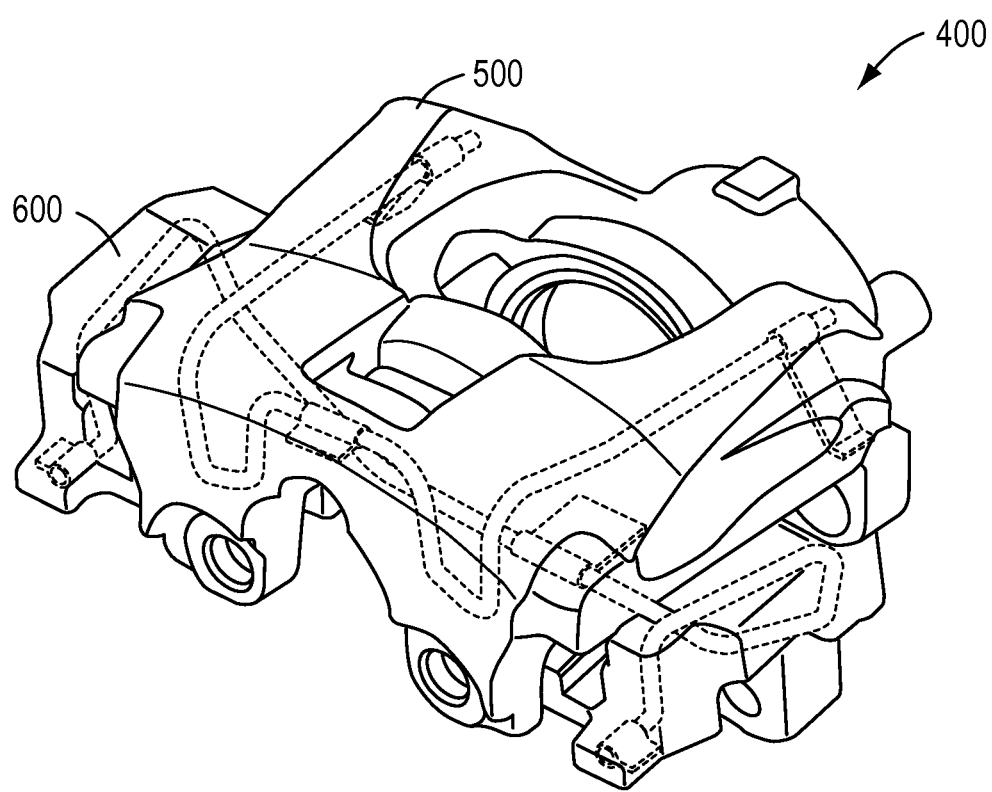
FIG. 26 is a perspective view of an exemplary embodiment of a damped caliper assembly in accordance with the present disclosure, which shows cables embedded within a caliper and an anchor bracket of the assembly.
Figure 27:
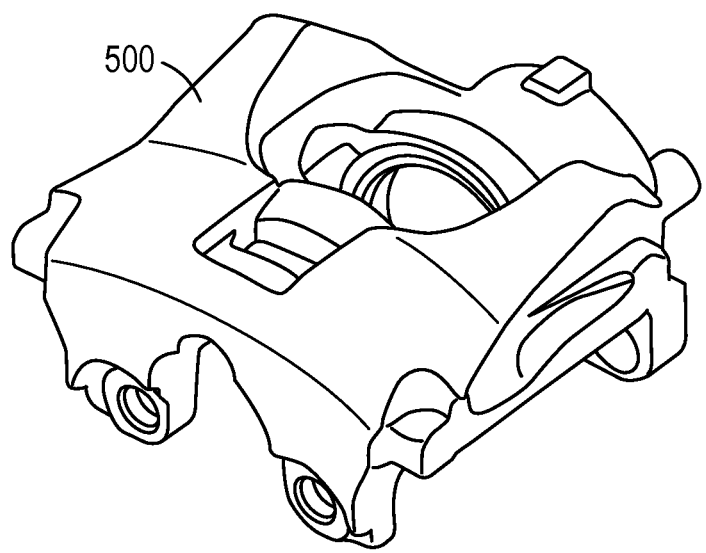
FIG. 27 is a perspective view of the caliper of the assembly of FIG. 26.

Various additional embodiments of the present disclosure contemplate, caliper assemblies, including a caliper and an anchor bracket, which utilize Coulomb friction between individual wires of cables positioned within the assembly to dampen a resonant frequency of the assembly (i.e., of the caliper and/or anchor bracket). FIGS. 26-30 illustrate an exemplary embodiment of a damped caliper assembly 400 in accordance with the present disclosure. As shown in FIG. 26, the caliper assembly 400 includes a caliper 500 and an anchor bracket 600 that is configured to mount a brake pad to the caliper 500. As above, in various exemplary embodiments, two brake pads may be contained within the caliper 500 (i.e., which is positioned over a cheek portion of a rotor) with their friction surfaces facing the rotor. In this manner, when the brakes are applied, the caliper 500 clamps or squeezes the two pads together onto the spinning rotor to slow and/or stop the vehicle.

Figure 28:
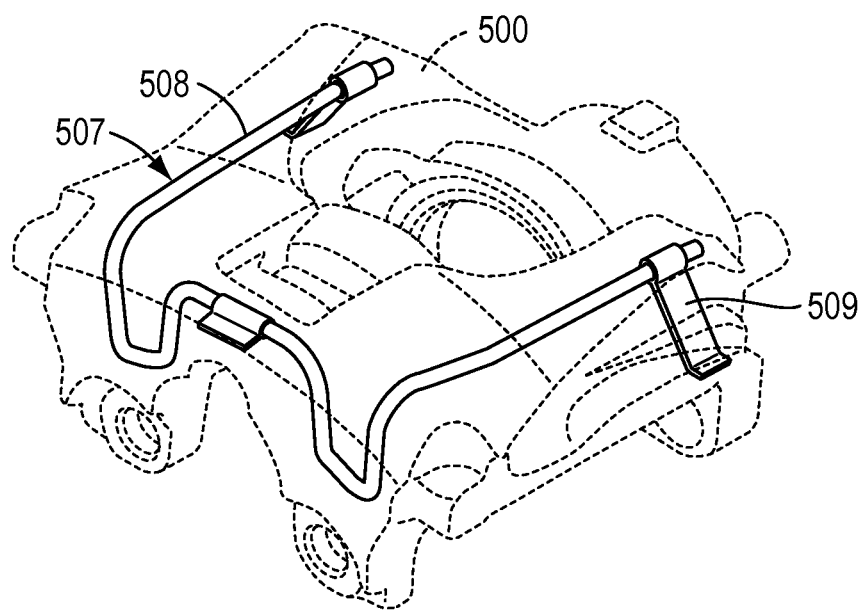
FIG. 28 is a perspective view of a cable insert of the caliper of FIG. 27.
Figure 29:
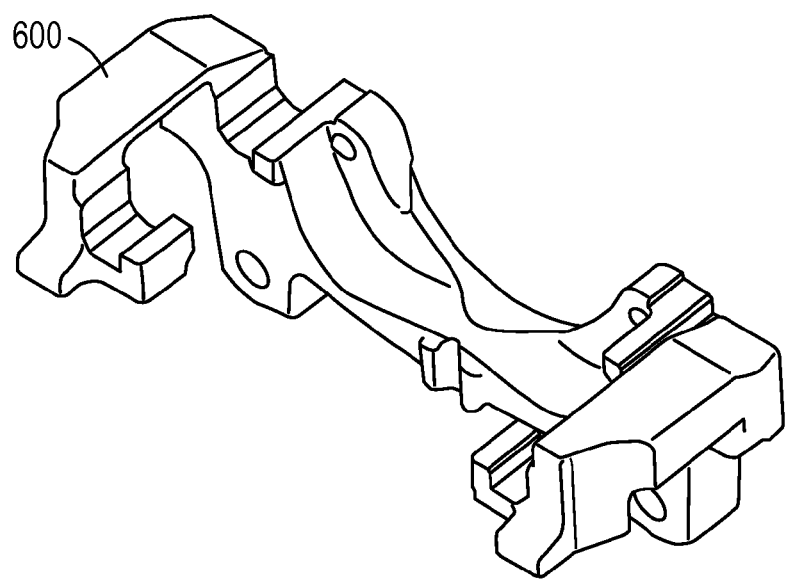
FIG. 29 is a perspective view of the anchor bracket of the assembly of FIG. 26.
Figure 30:
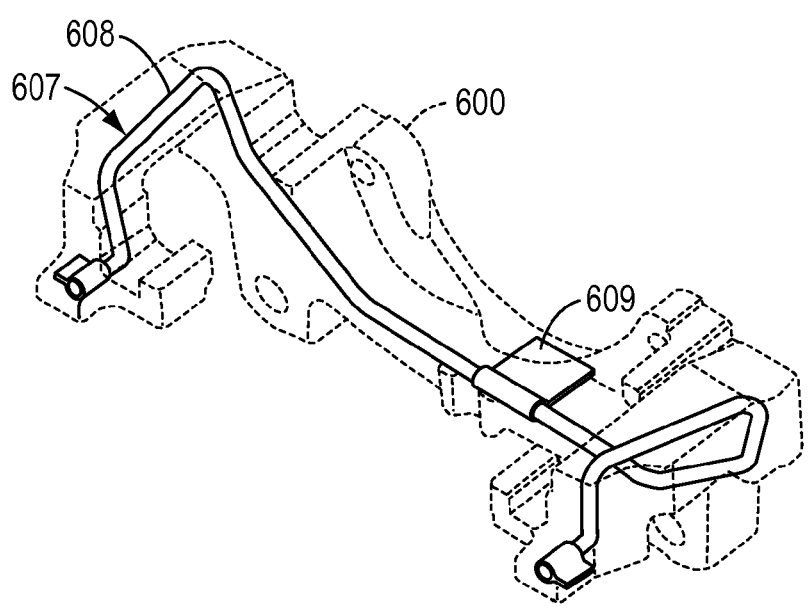
FIG. 30 is a perspective view of a cable insert of the anchor bracket of FIG. 29.

Similar to the above damped brake rotors and brake pads, in accordance with various exemplary embodiments; the caliper assembly 400 also includes at least one cable positioned within the assembly 400. In various embodiments, for example, a cable 508 may be embedded within the caliper 500 as shown in FIG. 28. In various additional embodiments, a cable 608 may be embedded within the anchor bracket 600 as illustrated in FIG. 30. Similar to the above brake rotor 100, various embodiments of the present disclosure, contemplate embedding the respective cables 508, 608 within the caliper 500 and anchor bracket 600 during the casting process such that the cables 508, 608 are positioned to maximize each components respective damping capacity.

As shown respectively in FIGS. 28 and 30, in various embodiments, the cables 508, 608 are configured as inserts 507, 607 that are respectively embedded within the caliper 500 and anchor bracket 600. Similar to the insert 107 above, each insert 507, 508 may, for example, respectively include at least one locator feature 509, 609 (e.g., three locator features 509, 609 being shown in the exemplary caliper 500 and anchor bracket 600), which are used during the casting process to locate each insert 507, 607 within a casting mold. In this manner, the cables 508, 608 may each be properly positioned and aligned within the caliper 500 and anchor bracket 600 to maximize each component's respective damping capacity.

Similar to the cables 108 and 308 above, the cables 508, 608 each include a plurality of wires (not shown) that are in contact with one another such that a state of Coulomb friction exists between the contacting surfaces of the wires. Thus, similar to the cables 108, 308, during braking of the motor vehicle, the cables 508, 608 may respectively dampen a resonant frequency of the caliper 500 and the anchor bracket 600 (and the overall resonant frequency of the caliper assembly 400) via the Coulomb friction between the wires, which works to absorb the kinetic energy of the caliper assembly 400 and convert it into thermal energy.

Those of ordinary skill in the art would understand, however, that the caliper assembly 400, including the caliper 500 and the anchor bracket 600, illustrated in FIGS. 26-30 is exemplary only and intended to illustrate one embodiment of the present disclosure. Accordingly caliper assemblies in accordance with the present disclosure may have various configurations, including various configurations of calipers and anchor brackets, without departing from the scope of the present disclosure and claims, and are not bound by any specific designs, geometries and/or orientations.

Those of ordinary skill in the art would further understand that the present disclosure contemplates caliper assemblies 400, including any number, configuration (i.e., dimension and/or geometry), shape (i.e., pattern), and/or orientation of cables 508, 608, having any number and/or configuration of wires, embedded within the caliper 500 and/or the anchor bracket 600.

Figure 31:
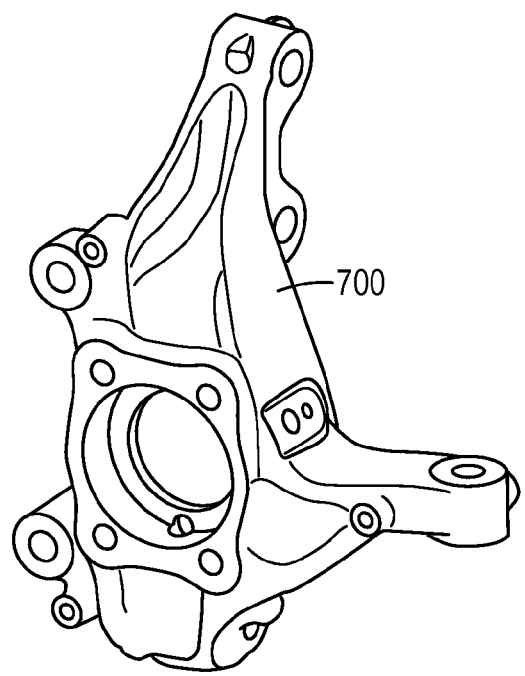
FIG. 31 is a perspective view of an exemplary embodiment of a steering knuckle in accordance with the present disclosure.
Figure 32:
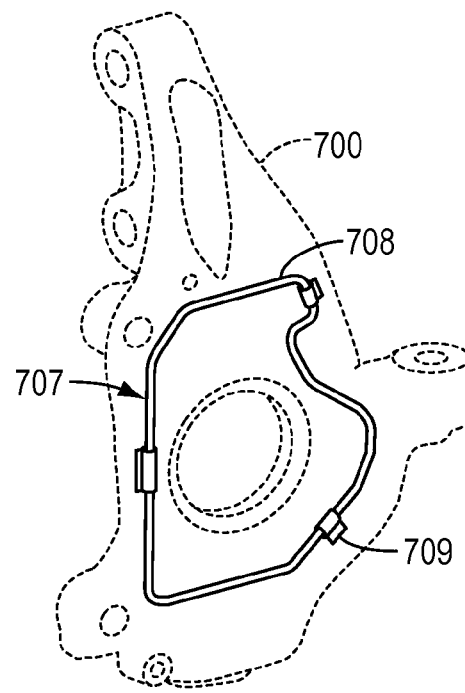
FIG. 32 is a perspective view of a cable insert of the steering knuckle of FIG. 31.

Various further embodiments of the present disclosure contemplate steering knuckles which utilize Coulomb friction between individual wires of cables positioned within the knuckle to dampen a resonant frequency of the knuckle. FIGS. 31 and 32 illustrate an exemplary embodiment of a damped steering knuckle 700 in accordance with the present disclosure. In various embodiments, for example, a wheel and tire assembly of a motor vehicle (not shown) may be attached to the vehicle's suspension via the knuckle 700 (i.e., the knuckle 700 may allow the tire/wheel to rotate while being held in a stable plane of motion).

Similar to the above brake components, in accordance with various exemplary embodiments, the knuckle 700 includes at least one cable 709 embedded within the knuckle 700, for example, during the casting process. As shown in FIG. 32, in various embodiments, the cable 708 is configured as an insert 707 that is embedded within the knuckle 700. The insert 707 may, for example, include at least one locator feature 709 (e.g., three locator features 709 being shown in the exemplary knuckle 700), which is used during the casting process to locate the insert within a casting mold.

Similar to the cables discussed above, the cable 708 includes a plurality of wires (not shown) that are in contact with one another such that a state of Coulomb friction exists between the contacting surfaces of the wires. Thus, during braking of the motor vehicle, the cable 708 may dampen a resonant frequency of the knuckle 700 via the Coulomb friction between the wires.

The present disclosure further contemplates methods of manufacturing a brake component, such as, for example, the components 100, 150, 160, 170, 200, 250, 260, 270, 300, 350, 360, 370, 400, 500, 600, and 700 described above with reference to FIGS. 1-32 in order to increase the damping capacity of the component. In accordance with various exemplary embodiments, to increase the damping capacity of the brake component 100, 150, 160, 170, 200, 250, 260, 270, 300, 350, 360, 370, 400, 500, 600, 700, at least one cable 108, 158, 168, 178, 208, 258, 268, 278, 308, 358, 368, 378, 408, 508, 608, 708 may be positioned within the brake component 100, 150, 160, 170, 200, 250, 260, 270, 300, 350, 360, 370, 400, 500, 600, 700.

In various embodiments, for example, the at least one cable 108, 158, 168, 178, 208, 258, 268, 278, 308, 358, 368, 378, 408, 508, 608, 708 may include a plurality of wires in sliding contact with one another. The at least one cable 108, 158, 168, 178, 208, 258, 268, 278, 308, 358, 368, 378, 408, 508, 608, 708 may be positioned, for example, within the brake component 100, 150, 160, 170, 200, 250, 260, 270, 300, 350, 360, 370, 400, 500, 600, 700 so that, during braking of the motor vehicle, the at least one cable 108, 158, 168, 178, 208, 258, 268, 278, 308, 358, 368, 378, 408, 508, 608, 708 dampens a resonant frequency of the component 100, 150, 160, 170, 200, 250, 260, 270, 300, 350, 360, 370, 400, 500, 600, 700 via friction generated by sliding movement between the plurality of wires.

The brake components 100, 150, 160, 170, 200, 250, 260, 270, 300, 350, 360, 370, 400, 500, 600, 700 may be manufactured using any known methods and/or techniques known to those of ordinary skill in the art. In various embodiments, for example, the components 100, 150, 160, 170, 200, 250, 260, 270, 400, 500, 600, 700 may be cast from a molten metal, such as, for example, iron that is poured into a mold. In various additional embodiments, the components may be molded from a composited material, such as, for example, reinforced carbon-carbon, a ceramic matrix composite, or a composite blend of materials with a Phenolic plastic resin that is hot molded in a curing press.

Figure 8:
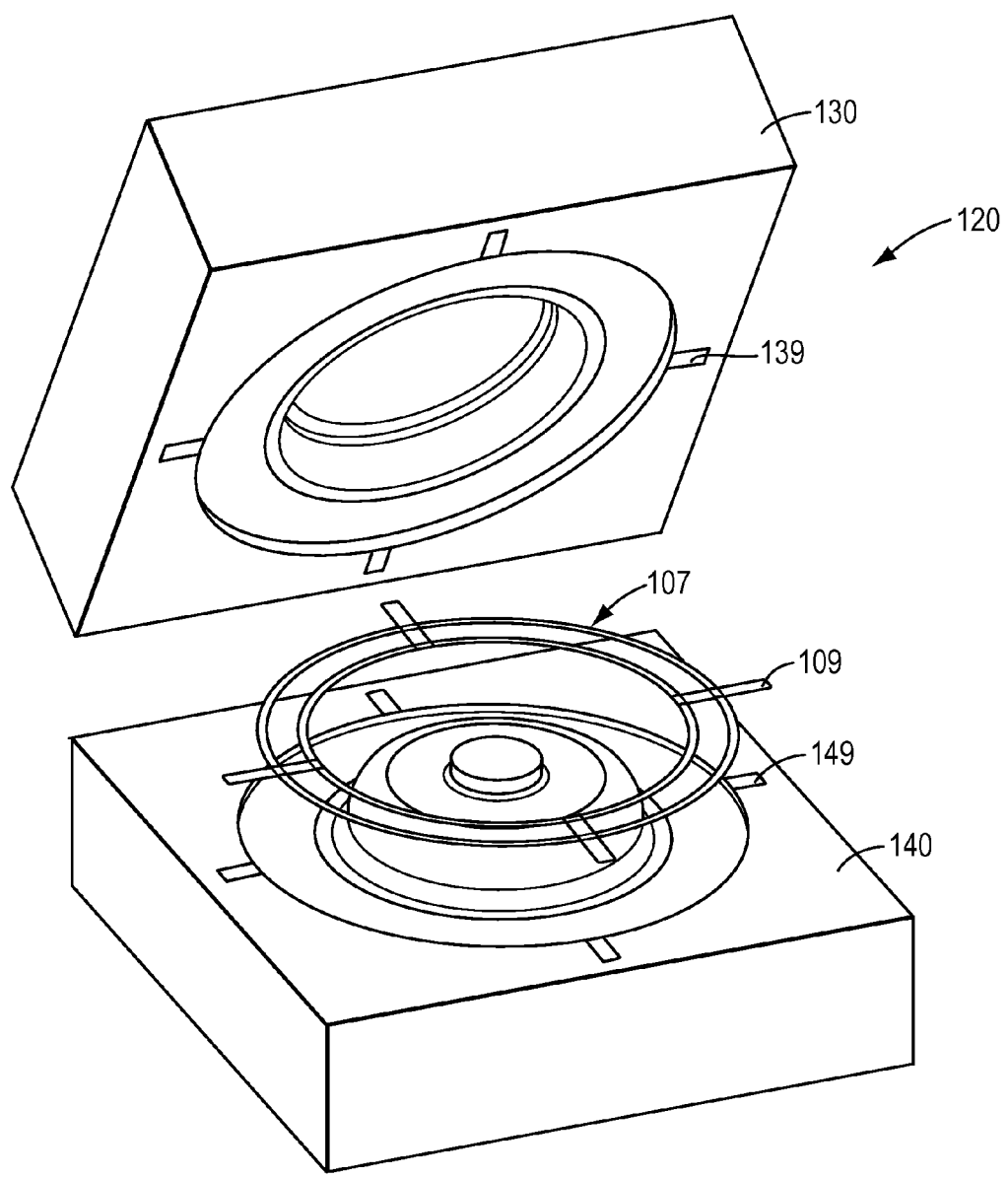
FIG. 8 is a perspective view of an exemplary embodiment of a mold in accordance with the present disclosure for casting the brake rotor of FIG. 1.
Figure 9:
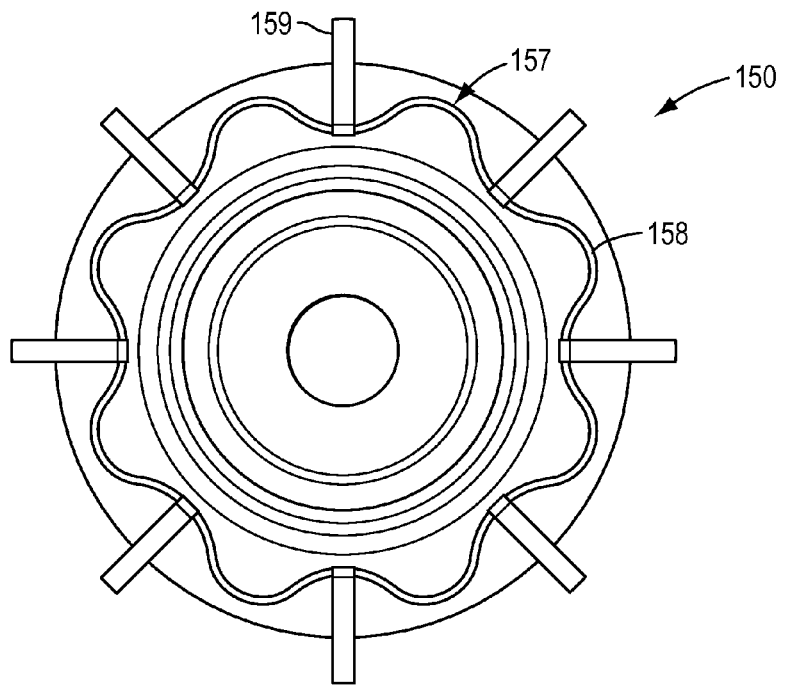
FIG. 9 is a top view of another exemplary embodiment of a damped brake rotor in accordance with the present disclosure, with a portion removed to show a cable insert.
Figure 10:
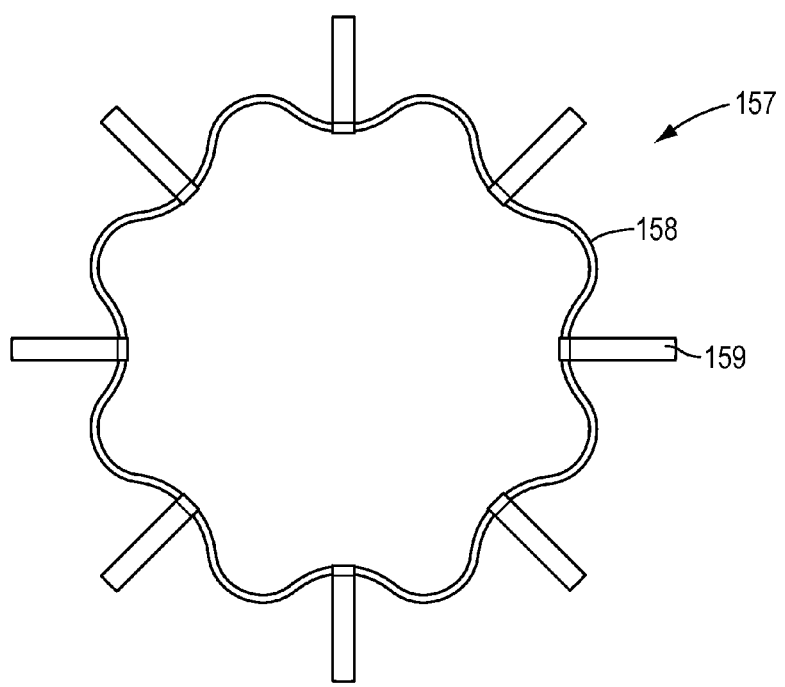
FIG. 10 is a top view of the cable insert of the brake rotor of FIG. 9.
Figure 11:
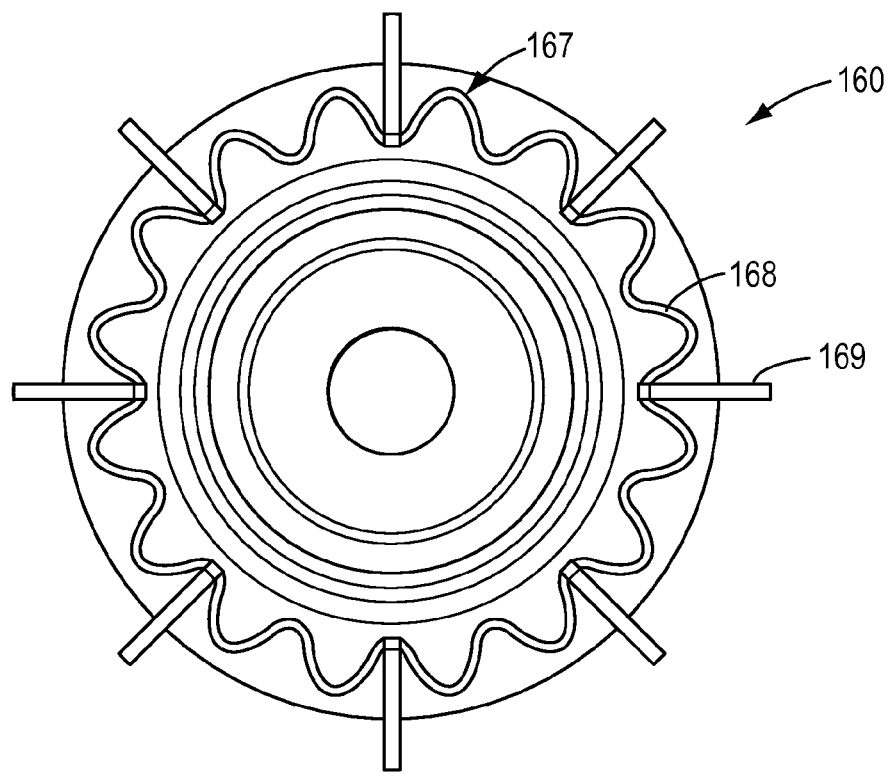
FIG. 11 is a top view of yet another exemplary embodiment of a damped brake rotor in accordance with the present disclosure, with a portion removed to show a cable insert.
Figure 12:
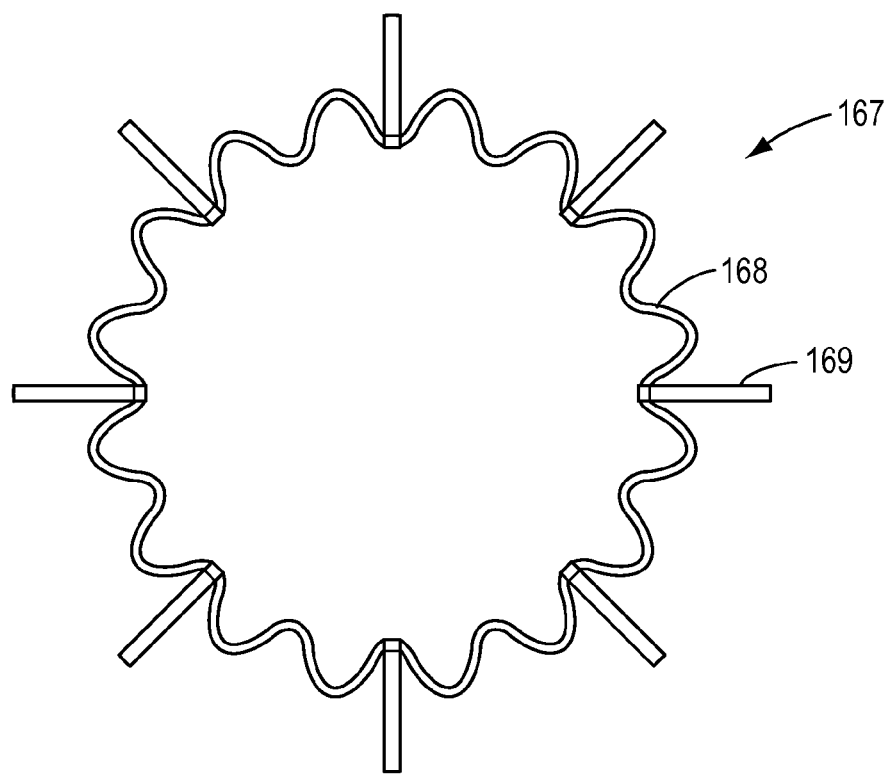
FIG. 12 is a top view of the cable insert of the brake rotor of FIG. 11.

With reference to the brake rotor 100 described above and illustrated in FIGS. 1-8, for example, in accordance with various exemplary embodiments, a plurality of cables 108 may be embedded within a cheek portion 102 of the rotor 100 during the casting process. As illustrated in FIG. 8, in various embodiments, the cables 108 may be configured into at least one insert 107 (one insert 107 being shown in the exemplary embodiment of FIG. 8) that is placed into a casting mold 120, which is configured to form the rotor 100. In various embodiments, for example, the insert 107 may be placed into the casting mold 120 by locating the insert 107 between an upper pattern 130 of the casting mold 120 and a lower pattern 140 of the casting mold 120.

The insert 107 may be located between the upper and lower patterns 130 and 140, for example, by aligning at least one locator feature 109 (four locator features 109 being shown in the exemplary embodiment of FIG. 8) on the insert 107 with at least one corresponding locator feature 139, 149 in each of the upper and lower patterns 130 and 140. In this manner, the cables 108 may be properly positioned and aligned within the casting mold 120.

In various additional embodiments, after casting the brake rotor 100, portions of the locator features 109 that extend beyond a periphery of the rotor 100 (see FIG. 1) may be degated (or removed), as would be understood by those of ordinary skill in the art.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, those of ordinary skill in the art would understand that the present teachings as disclosed would work equally well for any type of vehicle having a braking system that utilizes brake rotors.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A brake component for a motor vehicle, comprising:
   a body; and
   at least one cable comprising a plurality of wires, each of the plurality of wires having a surface in sliding contact with surfaces of adjacent wires of the plurality of wires,
   wherein the at least one cable is embedded centrally in both a radial direction and an axially direction within the body such that an outer surface of the at least one cable substantially contacts an inner surface of the body around an entire perimeter of the at least one cable, and
   wherein, during braking of the motor vehicle, sliding movement of the surfaces of the plurality of wires relative to each other dampens a resonant frequency of the component.

2. The brake component of claim 1, wherein the brake component is a brake rotor.

3. The brake component of claim 1, wherein the brake component is a brake pad.

4. The brake component of claim 1, wherein the brake component includes a caliper, a caliper anchor bracket, and/or a steering knuckle.

5. A brake rotor, comprising:
   a solid cheek portion; and
   at least one cable embedded in an axially and radially central position within the solid cheek portion, the at least one cable comprising a plurality of wires such that,
   during braking of a motor vehicle, sliding movement of surfaces of the plurality of wires relative to each other dampens a resonant frequency of the rotor.

6. The brake rotor of claim 5, wherein the at least one cable comprises a plurality of cables.

7. The brake rotor of claim 5, wherein the at least one cable forms a circular ring.

8. The brake rotor of claim 5, wherein the at least one cable forms a wave pattern.

9. The brake rotor of claim 5, wherein the at least one cable comprises at least one locator feature.

10. The brake rotor of claim 9, wherein the at least one locator feature comprises at least one locator tab.

11. The brake rotor of claim 5, wherein the solid cheek portion comprises an outer friction member and/or an inner friction member, wherein a plurality of fin elements connect the outer friction member to the inner friction member, and wherein the at least one cable is embedded centrally within the outer friction member and/or the inner friction member.

12. A method of manufacturing a brake component comprising:
   embedding at least one cable in a radially and axially central position within the brake component such that substantially an entire outer surface of the at least one cable contacts an inner surface of the brake component,
   wherein a plurality of wires in the at least one cable are configured to slide relative to one another to generate friction to dampen a resonant frequency of the component.

13. The method of claim 12, wherein the brake component includes a brake rotor, and wherein the embedding comprises placing the at least one cable into a casting mold configured to form the brake rotor.

14. The method of claim 13, wherein the placing comprises locating the at least one cable between an upper pattern of the casting mold and a lower pattern of the casting mold.

15. The method of claim 14, wherein the locating comprises aligning at least one locator feature on the at least one cable with at least one corresponding locator feature in each of the upper and lower patterns.

16. The method of claim 15, further comprising, after casting of the brake rotor, degating portions of the at least one locator feature on the at least one cable that extend beyond a periphery of the brake rotor.

17. The brake rotor of claim 5, wherein the at least one cable is embedded such that an outer surface of the at least one cable is at least about 3 mm from an outer surface of the cheek portion.

18. The method of claim 12, wherein the brake component includes a brake rotor, and wherein the embedding comprises positioning the at least one cable such that an outer surface of the at least one cable is at least about 3 mm from an outer surface of the rotor.

19. The brake component of claim 1, wherein the outer surface of the at least one cable is bonded to the inner surface of the body.

20. The brake rotor of claim 5, wherein an outer surface of the at least one cable substantially contacts an inner surface of the solid cheek portion around an entire perimeter of the at least one cable.

21. The brake rotor of claim 20, wherein the outer surface of the at least one cable is bonded to the inner surface of the cheek portion.

* * * * *